US007412009B2

(12) United States Patent
DeMoor

(10) Patent No.: US 7,412,009 B2
(45) Date of Patent: Aug. 12, 2008

(54) APPARATUS AND METHOD FOR AUTOMATIC PERFORMANCE CONTROL IN A DIGITAL RADIO

(75) Inventor: Robert G. DeMoor, Sugar Land, TX (US)

(73) Assignee: Texas Instruments Incorporated, Dallas, TX (US)

( * ) Notice: Subject to any disclaimer, the term of this patent is extended or adjusted under 35 U.S.C. 154(b) by 504 days.

(21) Appl. No.: 10/828,452

(22) Filed: Apr. 20, 2004

(65) Prior Publication Data

US 2005/0232375 A1 Oct. 20, 2005

(51) Int. Cl.
*H04L 27/16* (2006.01)

(52) U.S. Cl. ....................... 375/324; 375/340; 348/473; 348/729

(58) Field of Classification Search ................ 375/316, 375/324, 340, 342; 348/184, 388.1, 441, 348/473–475, 484, 487, 725, 729
See application file for complete search history.

(56) References Cited

U.S. PATENT DOCUMENTS 5,982,819 A * 11/1999 Womack et al. ............ 375/316
6,137,539 A * 10/2000 Lownes et al. ............ 348/569
7,230,655 B2 * 6/2007 Nonomura ................ 348/734

* cited by examiner

*Primary Examiner*—Dac V. Ha
(74) *Attorney, Agent, or Firm*—Wade J. Brady, III; Frederick J. Telecky, Jr.

(57) ABSTRACT

In digital radio technology, information channels describing the properties of the associated performance channel(s) are included in the broadcast band. The digital radio determines when selected signal groups are present in the information channels. Upon identification of a selected signal group, the digital radio automatically reconfigures itself into a user-determined configuration for processing the performance channel. By way of specific example, the user can determine that the equalization of the performance channel for selected musical formats and/or selected artists.

14 Claims, 2 Drawing Sheets

APPARATUS AND METHOD FOR AUTOMATIC PERFORMANCE CONTROL IN A DIGITAL RADIO

FIELD OF THE INVENTION

This invention relates generally to digital radios and, more particularly, to employing the digital radio to improve the performance of the digital radio for the user. Many features affecting the performance now controlled manually by a user can be controlled automatically.

BACKGROUND OF THE INVENTION

At the present time in digital radios, a multiplicity of formats for broadcast band transmission is in use. The common factor is the inclusion, in a transmitted signal of at least one digitally modulated channel in the transmitted channel. Referring to FIG. 1, a block diagram of a digital radio 10, according to the prior art, is shown. The digital radio 10 includes an antenna unit 5. The antenna unit can be a part of the digital radio 10 or can be coupled to the digital radio by a conducting element. The signals picked up by the antenna 5 are applied to the receiver unit/down-converter unit 101. The output signals of the receiver unit/down-converter unit 101 are modulated signals having an intermediate frequency. The receiver unit/down-converter unit 101 applies the intermediate frequency signals to analog-to-digital converter unit 102. The analog-to-digital converter 102 converts the digitally-encoded signal carriers and the analog-encoded signal carriers to digital serial data. The output signals from the analog-to-digital converter are applied to the demodulator unit/processor unit 103. The demodulator unit/processor unit 103 demodulates and decodes both the analog and digital transmitted signal content. The analog and digital signal channel signals are applied to the demodulator unit/processing unit 103 together, but are demodulated and processed separately in the unit 103. The demodulator unit/processing unit 103 exchanges program and data signals with the memory unit 104. The processing unit 103, in response to a user input and the program stored in memory unit 104, processes the signals received from the analog-to-digital converter unit 102. For example, a decompression algorithm can be applied to the received signals. The processed signals from the demodulator unit/processing unit 103 are applied to digital to analog converter unit 105. The output signals from the digital to analog converter are applied through amplifying units 109 through 110 to speaker unit 107 through 108, respectively.

As will be clear to those skilled in the art, the foregoing description is meant to be illustrative rather than comprehensive. Part of the problem resides in the fact that at the present time, the format of the digital radio broadcast band has not been standardized. As indicated above, the definition of a digital radio broadcast band includes the requirement that at least one of the channels within the broadcast band is encoded digitally. The remaining channels can be encoded with analog and/or digital encoding. Typically, the broadcast band includes a performance channel, the contents of which are applied to the digital radio's speakers for the user. In addition, generally, at least one digital channel, referred hereinafter as the information channel, includes the identification of the properties of an associated performance band or performance bands. The properties can include an identification of the performance piece, the principal artists, the category or categories best identifying the piece, the type of performance pieces broadcast in the transmission band, etc. In some implementations, the performance channel(s) is (are) combined with the information channel(s). The properties of the associated performance channel(s) can be presented to the user as audio or visual information permitting the user to make a choice that can be entered manually in the digital radio.

The entry of the user input alters the configuration of the digital radio. When the information channel identifies a category of material broadcast over this band or the category of an associated performance piece, the user can use a technique generally referred to as equalization to enhance the performance. In equalization, the frequency spectrum of the demodulated and decoded performance piece is divided into a plurality of frequency bands. The amplification of the frequency bands is selected for each frequency region to enhance the performance, for the user, for that particular category of performance piece. The user can be provided with controls so the equalization can be performed for each performance piece or for a plurality of similar performance pieces.

A need has therefore been felt for apparatus and an associated method having the feature that the information band of a digital radio broadcast band can used to control automatically the reproduction of the performance channel. It would be a further feature of the present invention to provide for apparatus monitoring the information channel of a digital radio broadcast band. It would be a still further feature of the apparatus and associated method to provide a digital radio that is automatically reconfigured in response to a selected signal group in the information channel of a digital signal broadcast band. It would be still further feature of the apparatus and associated method to control automatically and selectively the relative amplitudes of predetermined frequency ranges of demodulated, decoded performance channels.

SUMMARY OF THE INVENTION

The aforementioned and other features are accomplished, according to the present invention, by providing apparatus and the associated software in a digital radio for monitoring an information channel for certain preselected signal groups and, based on the preselected signal groups, preparing a performance channel for application to the speaker system. When a preselected signal group is identified, then the digital radio reconfigures itself automatically into a user-designated configuration. For example, in response to preselected signals, the digital radio will control the relative amplitude of frequency ranges in the demodulated, decoded performance channel to enhance automatically the audio material presented to the user.

Other features and advantages of the present invention will be more clearly understood upon reading of the following description and the accompanying drawings and claims.

DESCRIPTION OF THE PREFERRED EMBODIMENT

1. Detailed Description of the Drawings

Figure 1:
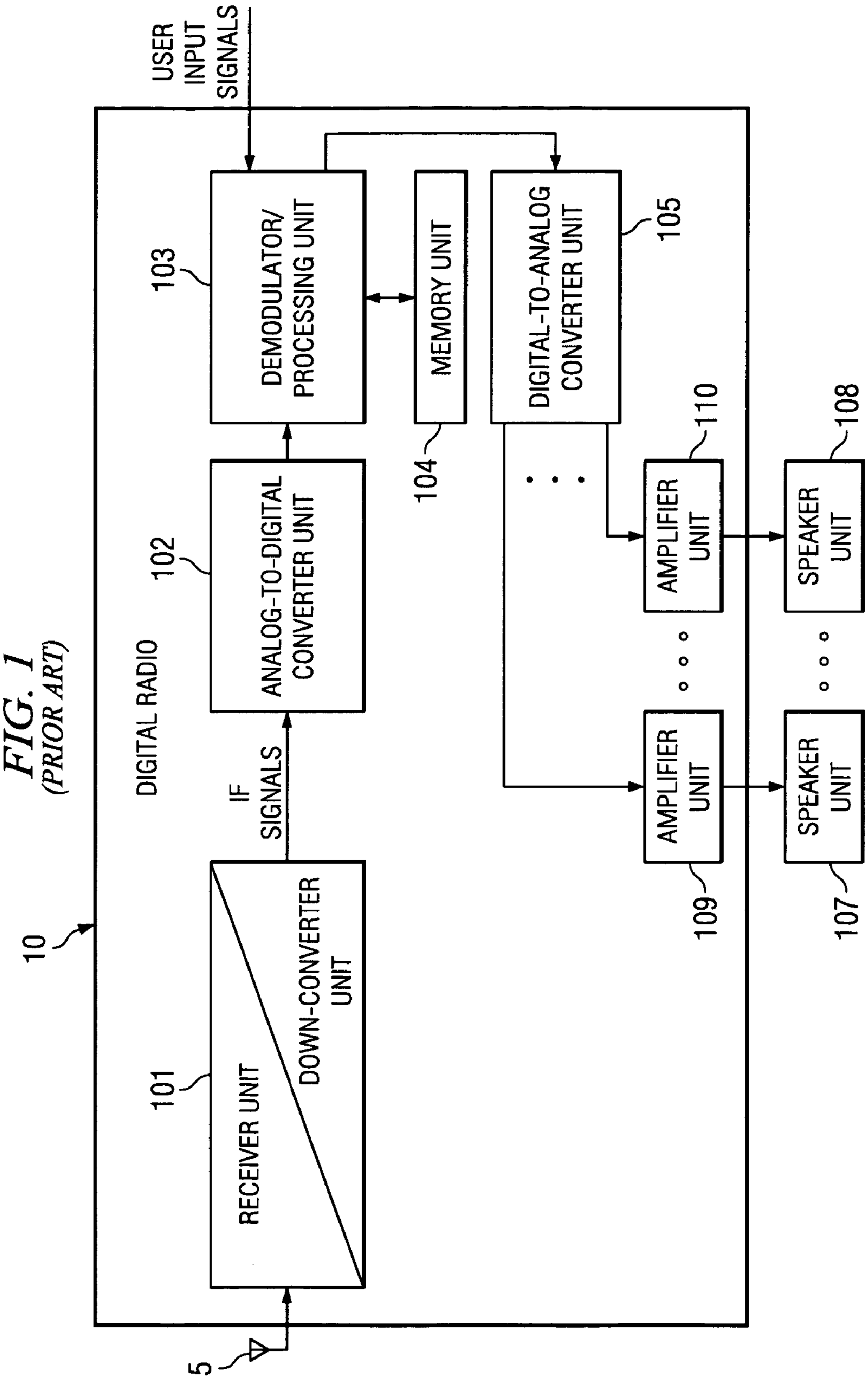
FIG. 1 (PRIOR ART)
FIG. 1 is block diagram illustrating the principal components of a digital radio.

FIG. 1 has been described with reference to the related art.

Figure 2:
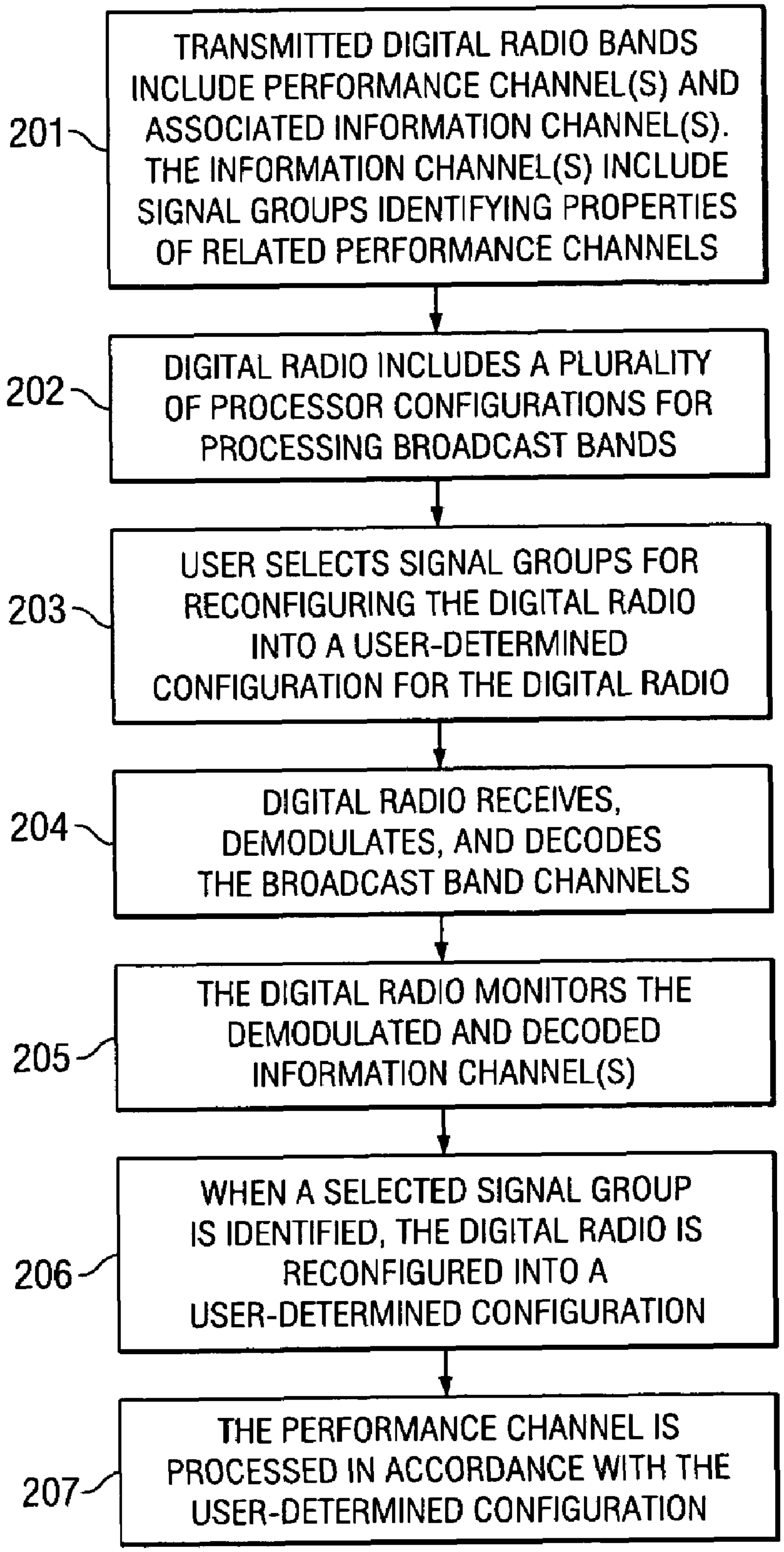
FIG. 2 illustrates the process for configuring the processor in accordance with the present invention.

Referring next to FIG. 2, the procedure for implementing the present invention is shown. In step 201, a broadcast band for reception by a digital radio includes at least one channel transmitting a performance for eventual application to the speaker system and at least one channel transmitting information, properties or parameters concerning the associated performance channel. For example, the information channel or channels can include the category of the musical format associated performance channel(s) such as jazz, country western, classical, etc.; the artist; title of the performance, etc. In step 202, the digital radio is implemented in such a manner that the digital radio can be configured to process the performance channel in one of a plurality of configurations. In step 203, the user selects signal groups that designate the information, properties or parameters of interest and enters these signal groups in the digital radio and correlates the selected signal group(s) with a digital radio configuration. The digital radio receives and demodulates and decodes channels of a selected broadcast band in step 204. In step 205, the demodulated and decoded broadcast band channels are applied to a processor for processing. During the processing of the demodulated channels, the processor tests to see if any of the user-selected signal groups are present in the information channels. When, in step 206, processor identifies a selected signal group, the processor reconfigures the digital radio to process the performance channel in a user-determined manner. In step 207, the performance channel is processed in accordance with the user-determined configuration and is applied to the digital radio speakers.

Operation of the Preferred Embodiment

The present invention monitors the information channel of a digital radio broadcast band. In response to selected signals in the information channel, the digital radio receiver is automatically reconfigured to provide for user-selected processing of the performance channel. The reconfiguration can be relatively simple. In response to selected signal groups, the digital radio signal can process an audio performance track in a frequency-determined manner, i.e., equalization. The reconfiguration is performed without user intervention, the user having during a set-up period, identified the selected signal groups and the associated response to the selected signal groups.

The reconfiguration can be as simple as setting a switch or can involve invoking a software procedure that specifies the processing of the performance channels. In addition, the information channel can include signal groups concerning the content of all the performance items of the broadcast band. In this situation, the digital radio can be configured to provide the enhanced performance for the performance items of the broadcast band to which the digital radio is tuned.

While the invention has been described with respect to the embodiments set forth above, the invention is not necessarily limited to these embodiments. Accordingly, other embodiment variations, and improvements not described herein, are not necessarily excluded from the scope of the invention, the scope of the invention being defined by the following claims.

What is claimed is:

1. A digital radio, the digital radio receiving broadcast bands including at least one information channel and at least one performance channel, the digital radio comprising;

a processor processing all performance channels, the processor having a selectable mode monitoring at least one information channel the broadcast band selected by the receiver; and a memory unit exchanging signals with the processor, the memory unit including at least one software program for configuring the processor to process performance channels in a selected mode of operation;

wherein when the processor selectable mode identifies a preselected signal set in the information channel, the processor accesses a software program, the processor in response to the software program processes the performance channels in a manner determined by the software program.

2. The digital radio as recited in claim 1 wherein in response to a first signal set, the processor applies equalization parameters to the performance channel.

3. The digital radio as recited in claim 2 wherein the equalization procedure is selected from equalization procedure appropriate for one member selected from any audio genre.

4. The digital radio as recited in claim 1 wherein the preselected signal set relates to at least one property of an associated performance piece.

5. The digital radio as recited in claim 1 wherein the preselected signal set relates to at least one property of the performance channel broadcast band.

6. A method for enhancing the reproduction of a performance item by a digital radio, the method comprising:

monitoring a demodulated and decoded information channel for selected signal groups; and when a preselected signal group is identified, reconfiguring the digital radio in a user-determined manner;

wherein reconfiguring the digital radio results in a predetermined processing of a demodulated and decoded performance channel by the digital radio.

7. The method as recited in claim 6 wherein the reconfigured digital radio applies an equalization to the demodulated and decoded performance channel determined by the selected signal group.

8. The method as recited in claim 6 wherein the selected signal groups identify at least one property of a related performance item.

9. The method as recited in claim 6 wherein the selected signal groups identify at least one property of performance items of a related performance channel.

10. A system for transmitting a performance item for reproduction, the system comprising:

a broadcast band transmitting unit, the broadcast band transmitting unit transmitting a broadcast band including performance item in a performance channel and signal groups in an information channel identifying properties of the performance items, the transmitting unit including at least one digitally-encoded channel; and a digital radio for demodulating and decoding the broadcast band channels, the digital radio having a plurality of configurations for the performance channel, the digital radio assuming one of the pluralities of configurations in response to a selected signal group in the information channel.

11. The system as recited in claim 10 wherein at least one of the pluralities of configurations is an equalization configuration for the demodulated and decoded performance item.

12. The system as recited in claim 10 wherein a signal group identifies at least one property of a related performance item.

13. The system as recited in claim 10 wherein a signal group in the information channel identifies at least one property of a related performance item channel.

14. The system as recited in claim 10 wherein the user determines the relationship between the signal group and the performance channel configuration.

* * * * *